United States Patent
Arian et al.

(10) Patent No.: US 10,174,852 B2
(45) Date of Patent: Jan. 8, 2019

(54) HYBRID CHECK VALVE

(71) Applicant: HALLIBURTON ENERGY SERVICES, INC., Houston, TX (US)

(72) Inventors: Abbas Arian, Houston, TX (US); Bruce Mackay, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 93 days.

(21) Appl. No.: 15/305,249

(22) PCT Filed: Sep. 9, 2014

(86) PCT No.: PCT/US2014/054703
§ 371 (c)(1),
(2) Date: Oct. 19, 2016

(87) PCT Pub. No.: WO2016/039728
PCT Pub. Date: Mar. 17, 2016

(65) Prior Publication Data
US 2017/0037980 A1    Feb. 9, 2017

(51) Int. Cl.
*F16K 15/18*   (2006.01)
*E21B 49/08*   (2006.01)
(Continued)

(52) U.S. Cl.
CPC ............ *F16K 15/183* (2013.01); *E21B 34/06* (2013.01); *E21B 49/082* (2013.01);
(Continued)

(58) Field of Classification Search
CPC .. F16K 15/186; F16K 15/183; F16K 31/1221; F16K 31/1223; F16K 14/044;
(Continued)

(56) References Cited

U.S. PATENT DOCUMENTS 4,485,724 A * 12/1984 Demircan ............. F16K 15/183
91/170 MP
4,793,590 A    12/1988 Watson et al.
(Continued)

FOREIGN PATENT DOCUMENTS

CN    103492773    1/2014
EP    1865238    12/2007
(Continued)

OTHER PUBLICATIONS

International Patent Application No. PCT/US2014/054703, International Search Report and Written Opinion, dated May 27, 2015, 11 pages.
(Continued)

*Primary Examiner* — P. Macade Nichols
(74) *Attorney, Agent, or Firm* — Kilpatrick Townsend & Stockton LLP

(57) ABSTRACT

An assembly is provided that can include check valve. The check valve can include a ball positioned between an inflow line and an outflow line. The ball can be movable between (i) an open position at which a fluid is allowed to flow between the inflow line and the outflow line and (ii) a closed position at which the fluid is prevented from flowing between the inflow line and the outflow line. The assembly can also include a spring positioned adjacent to the ball and operable to bias the ball in a closed position. The assembly can further include a poppet positioned adjacent to the ball. The poppet can be movable in response to a communication of a pilot pressure to the poppet. Further, the ball can be movable to the closed position in response to a force applied by the poppet.

18 Claims, 6 Drawing Sheets

(51) Int. Cl.
*E21B 34/06* (2006.01)
*F16K 15/04* (2006.01)
*F16K 31/42* (2006.01)
*F16K 31/122* (2006.01)
*E21B 43/12* (2006.01)
*E21B 34/00* (2006.01)

(52) U.S. Cl.
CPC ........ *F16K 15/044* (2013.01); *F16K 31/1221* (2013.01); *F16K 31/42* (2013.01); *E21B 43/121* (2013.01); *E21B 2034/002* (2013.01)

(58) Field of Classification Search
CPC ........ F16K 14/04; F16K 31/40; F16K 31/406; F16K 31/408; E21B 34/06; E21B 49/082; E21B 43/121; E21B 234/002
USPC .................... 137/517, 529; 251/30.01–30.05
See application file for complete search history.

(56) References Cited

U.S. PATENT DOCUMENTS

| | | |
|---|---|---|
| 5,641,148 A | 6/1997 | Penea et al. |
| 5,937,896 A | 8/1999 | Hashiba et al. |
| 5,992,696 A | 11/1999 | Schultz et al. |
| 6,244,294 B1* | 6/2001 | Hollis .................. F01P 11/0238 123/41.27 |
| 2002/0003221 A1 | 1/2002 | Koyama et al. |
| 2009/0114289 A1 | 5/2009 | Martin et al. |
| 2011/0158836 A1* | 6/2011 | Wood ...................... F04B 15/02 417/554 |
| 2012/0018152 A1 | 1/2012 | Pelletier et al. |
| 2013/0025713 A1 | 1/2013 | Smith et al. |
| 2013/0248173 A1 | 9/2013 | Ross et al. |

FOREIGN PATENT DOCUMENTS

| | | |
|---|---|---|
| FR | 2262761 | 9/1975 |
| JP | 2006046491 | 2/2006 |
| WO | 2010111158 | 9/2010 |

OTHER PUBLICATIONS

European Patent Application No. 14901650.3, Extended European Search Report dated Mar. 21, 2018, 9 pages.

* cited by examiner

HYBRID CHECK VALVE

CROSS-REFERENCE TO RELATED APPLICATIONS

This is a U.S. national phase under 35 U.S.C. 371 of International Patent Application No. PCT/US2014/054703, titled "Hybrid Check Valve" and filed Sep. 9, 2014, the entirety of which is incorporated herein by reference.

TECHNICAL FIELD

The present disclosure relates generally to devices for use in well systems. More specifically, but not by way of limitation, this disclosure relates to a hybrid check valve.

BACKGROUND

A well system (e.g., an oil or gas well) is typically drilled for extracting hydrocarbons from a subterranean formation. Not every well system, however, contains enough hydrocarbons to make it commercially viable to continue operating the well. Once a wellbore has been drilled, operators of the well system can determine whether the well system has a commercially productive level of hydrocarbons by performing formation tests. Formation tests can establish formation pressure, permeability, formation fluid characteristics, and other useful information about the well system. Formation-testing tools can include a pump, which can be used to withdraw extraneous fluids (e.g., mud) from a formation. The pump can also be used to withdraw the targeted hydrocarbons from a formation for testing. The pump can be a double-acting pump. Check valves can be used to control the flow of the fluids through the pump. For example, check valves can cause fluid to enter one side of the pump and exit from the other side of the pump. Typically, fluids passing through the check valve can contain sand, dirt, and other debris that can become stuck in the check valves, affecting the performance of the pump. Accordingly, it can be challenging to pump fluids from a formation efficiently.

DETAILED DESCRIPTION

Figure 1:
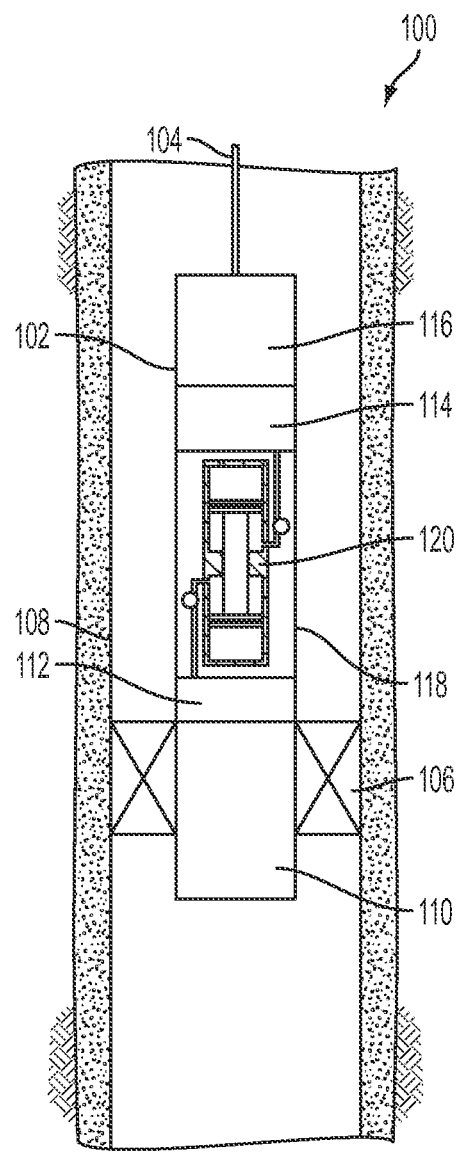
FIG. 1 depicts a cross-sectional side view of a system using a hybrid check valve according to one or more embodiments of the present disclosure.

Certain aspects and features of the present disclosure are directed to an assembly for a hybrid check valve. The hybrid check valve can include a chamber. An inflow line and an outflow line can be connected to the chamber for communicating fluids through the chamber (and thus through the hybrid check valve). The chamber can include a ball positioned between the inflow line and the outflow line. The ball can be moved between an open position and a closed position. When in the closed position, the ball can block the entryway between the inflow line and the chamber, sealing the entryway. The sealed entryway can prevent fluids from flowing from the inflow line into the chamber and to the outflow line. When in the open position, the ball does not block the entryway between the inflow line and the chamber, and fluids can flow from the inflow line into the chamber and out through the outflow line.

The assembly can also include a second chamber. The second chamber can include a poppet. The poppet can be positioned adjacent to the ball in the first chamber. The poppet can be positioned adjacent to the ball by being positioned near the ball or by sharing a common endpoint or border with the ball. The poppet can be actuated with pilot pressure. When in its closed state, the poppet can apply a force to the ball, moving the ball to its closed position. When in its open state, the poppet can remove the force from the ball, allowing the ball to move to its open position. Thus, a well operator can control the opening and closing of the hybrid check valve by actuating the poppet between its open and closed states.

In one example, a formation-testing tool can be deployed in a wellbore. The formation-testing tool can include a pump-out section for pumping fluids out of the formation and into the wellbore. The pump-out section can include a pump and a series of hybrid check valves for controlling the flow of fluids through the pump. A well operator can control the opening and closing of the hybrid check valves by operating solenoid valves associated with the hybrid check valves. For example, to close one of the hybrid check valves, the well operator can actuate the hybrid check valve's associated solenoid valve. Upon actuating the solenoid valve, hydraulic pressure can be delivered to a poppet inside the hybrid check valve. The hydraulic pressure can actuate a poppet inside the hybrid check valve, causing the poppet to move into its closed state. As the poppet moves into its closed state, the end of the poppet can press against a ball inside the hybrid check valve. The poppet can push the ball into a seat that is positioned at the entryway of a flow line, through which fluids can flow into the hybrid check valve. The force of the ball being pushed into the seat can create a seal, preventing fluids from passing from the flow line through the hybrid check valve (i.e., closing the hybrid check valve). Further, in some embodiments, the high pressure from the poppet firmly pressing the ball against the seat can crush, break, or push any debris stuck in the chamber out of the way. Effectively removing debris wedged in the chamber can prevent the hybrid check valve from becoming stuck partially open. Check valves that are partially stuck open (a problem often associated with traditional ball-and-spring check valves) can be detrimental to pumping operations.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 depicts a cross-sectional side view of a system 100 using a hybrid check valve according to one or more embodiments of the present disclosure. In this example, the system 100 is a well system (e.g., an oil or gas well for extracting fluids from a subterranean formation). The well system includes a wellbore 108. A formation-testing tool 102 can be lowered into the wellbore 108. In some embodiments, the formation-testing tool 102 can be lowered into the wellbore 108 on a wireline 104 or coiled tubing.

The formation-testing tool 102 can include various modules 110, 112, 114, 116, 118. For example, the formation-testing tool 102 can include a packer module 110 with packers 106 that expand between the formation-testing tool 102 and a wall of the wellbore 108. The formation-testing tool 102 can also include an instrument module 112 with the ability to collect data about the wellbore 108. Further, the formation-testing tool 102 can include a hydraulic power module 114 and an electronics module 116 for operating the various formation-testing tool 102 modules.

To pump fluids (e.g., mud or the targeted hydrocarbons) from the formation into the wellbore 108, the formation-testing tool 102 can include a pump-out module 118. The pump-out module 118 can include a pumping assembly 120 for pumping fluids. The pumping assembly 120 can include a double-acting pump. The pump can be hydraulically powered. The pump can be connected to one or more check valves, which can control the flow of fluids through the pump. In some embodiments, the check valves can be hybrid check valves. The pump can further be connected to one or more gauges, servos, flow lines, solenoid valves, potentiometers, sensors (e.g., pressure sensors) or other devices, which can be used to for operating the pump. The pump can pump fluids from an inflow line at one end (e.g., the lower end) of the pump-out module 118 to an outflow line at the other end (e.g., the upper end) of the pump-out module 118. While this specification uses the convention "inflow line" and "outflow line" for clarity, the "inflow" and "outflow" lines can alternatively be a "first flow line" and a "second flow line," as fluid can flow in either direction through these lines.

Figure 2:
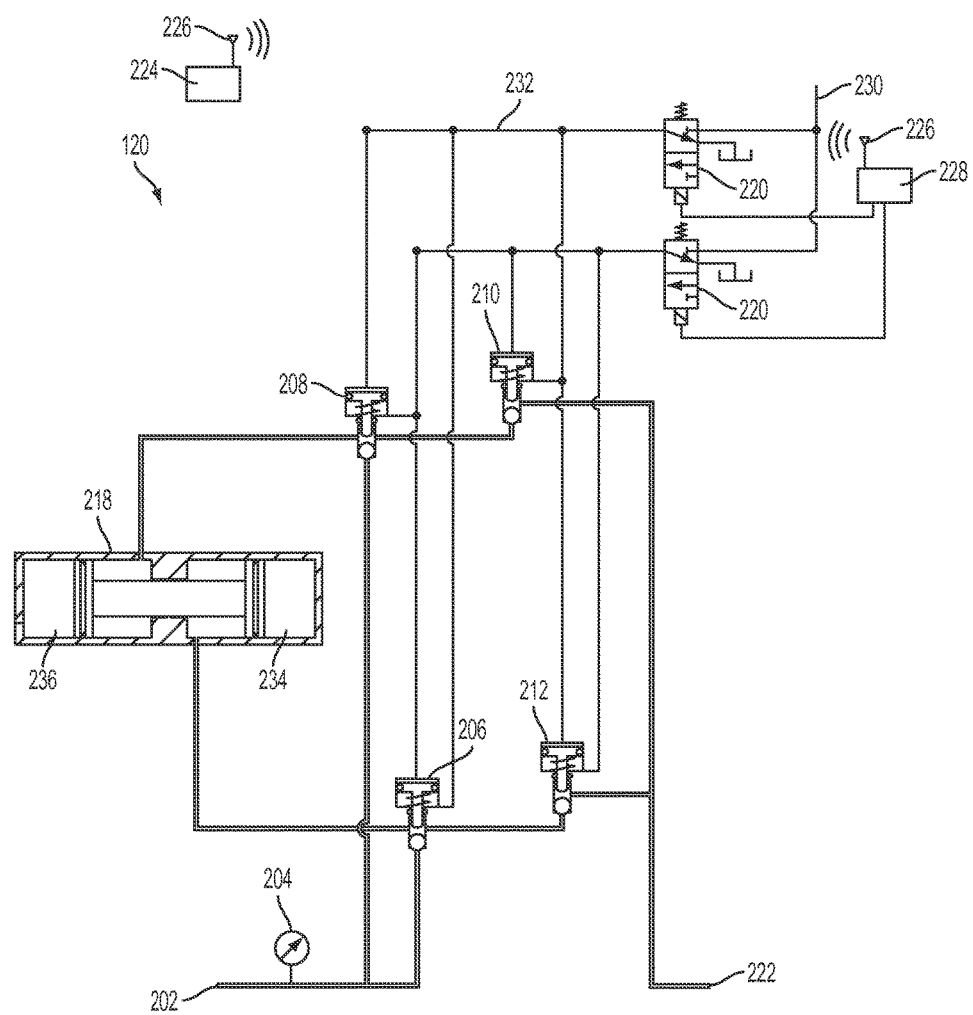
FIG. 2 depicts a schematic view of a pumping assembly according to one or more embodiments of the present disclosure.

FIG. 2 depicts a schematic view of a pumping assembly 120 according to one or more embodiments of the present disclosure. In this example, the pumping assembly 120 includes an inflow line 202. The inflow line 202 can be connected to an inlet pressure sensor 204 for determining the inlet pressure. In some embodiments, the inflow line 202 can be positioned at the lower end of a pump-out module (e.g., the pump-out module 118 of FIG. 1). The pumping assembly 120 can also include an outflow line 222. In some embodiments, the outflow line 222 can be positioned at the top of the pump-out module.

The inflow line 202 can further be connected to hybrid check valves 206, 208, 210, 212. The hybrid check valves 206, 208, 210, 212 can control the flow of fluids into and out of the pump 218. The pump 218 can be a double-acting pump. The operation of the hybrid check valves 206, 208, 210, 212 can be controlled by solenoid valves 220. The solenoid valves 220 can receive electrical power from a power source 228 and hydraulic pressure from a hydraulic line 230. The solenoid valves 220 can hydraulically actuate poppets inside the hybrid check valves 206, 208, 210, 212 via a hydraulic control line 232. By actuating the poppets inside the hybrid check valves 206, 208, 210, 212, a well operator can open or close the valves. The operation and configuration of the hybrid check valve 206 is further discussed with respect to FIG. 3.

In one example, hybrid check valves 208 and 212 can be forced closed via hydraulic pressure from the solenoid valve 220, and hybrid check valves 206 and 210 can be allowed to open. In this example, fluids from the wellbore can enter the pumping assembly 120 through inflow line 202. The fluids can pass by the inlet pressure sensor 204, which can determine the inlet pressure. The fluid can pass through the open hybrid check valve 206 and enter a first chamber 234 of the pump 218 on the right side (as depicted). Fluid that passed from the first chamber 234 of the pump 218 to a second chamber 236 (depicted on the left side of the pump 218) as a result of the last pump cycle can exit out the top of the left side of the pump 218. The fluid can then flow through the chamber in the closed hybrid check valve 208. Finally, the fluid can pass through the open hybrid check valve 210 and out an outflow line 222.

Fluid can also flow in the opposite direction from the outflow line 222 to the inflow line 202. For example, hybrid check valves 206 and 210 can be forced closed via hydraulic pressure from the solenoid valves 220, and hybrid check valves 208 and 212 can be allowed to open. In this example, fluids can enter the pumping assembly 120 through outflow line 222. The fluids can pass through the open hybrid check valve 212 and through the chamber in the closed hybrid check valve 206. The fluid can then enter the first chamber 234 of the pump 218 on the right side. Fluid that passed from the first chamber 234 of the pump 218 to the second chamber 236 of the pump 218 as a result of the last pump cycle can exit out the top of the left side of the pump 218. The fluid can flow through the open hybrid check valve 208 and out the inflow line 202.

In some embodiments, a computing device 224 can be in communication with and operate the power source 228. By operating the power source 228, the computing device 224 can control the operation of the solenoid valves 220, and thereby control the operation of the hybrid check valves 206, 208, 210, 212. Although depicted in this example as being external to the computing device 224, in some embodiments, the power source 228 can be internal to the computing device 224. The computing device 224 can be positioned at the wellbore surface, in the formation-testing tools (e.g., in electronics module 116 of FIG. 1), or elsewhere. The computing device 224 can include a processor interfaced with other hardware via a bus. A memory, which can include any suitable tangible (and non-transitory) computer-readable medium such as RAM, ROM, EEPROM, or the like, can embody program components that configure operation of the computing device 224. The computing device 224 can further include input/output interface components and additional storage.

The computing device 224 can operate the power source 228 via a communication device 226. The communication device 226 can be coupled to the computing device 224 and/or to the power source 228. In some embodiments, the communication device 226 can include a wire. In other embodiments, the communication device 226 can represent one or more of any components that facilitate a network connection. In the example shown in FIG. 2, the communication device 226 is wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In other examples, the communication device 226 can be wired and can include interfaces such as Ethernet, USB, or IEEE 1394.

Further, in some embodiments, the pumping assembly 120 can include one or more gauges, servos, flow lines, reservoirs, valves, solenoid valves, potentiometers, sensors (e.g., pressure sensors), power sources, or other devices.

Figure 3:
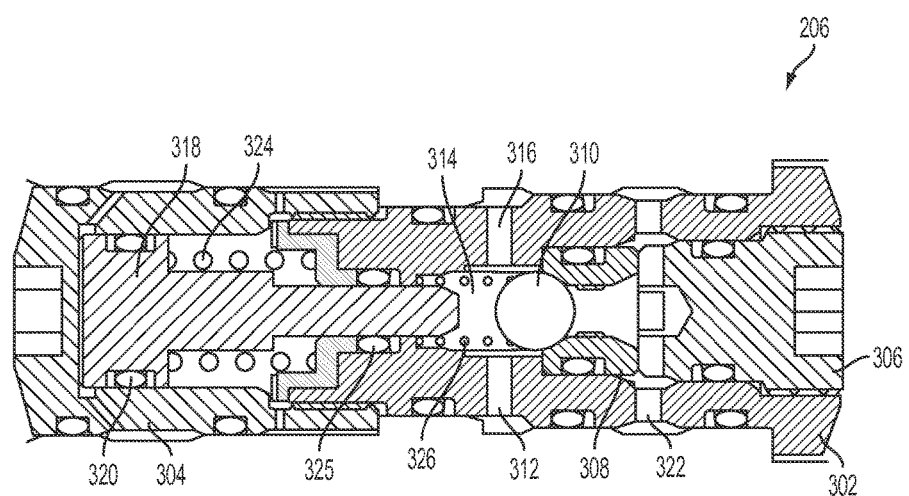
FIG. 3 depicts a cross-sectional side view of an assembly for a hybrid check valve according to one or more embodiments of the present disclosure.

FIG. 3 depicts a cross-sectional side view of an assembly for a hybrid check valve 206 according to one or more embodiments of the present disclosure. The hybrid check valve 206 includes a first outer housing 302 coupled to a second outer housing 304.

In some embodiments, the first outer housing 302 can include a cap 306 that is removable from the first outer housing 302. In some embodiments, the cap 306 can be removed to provide access for cleaning components (e.g., the ball 310, seat 308, or spring 326) within the hybrid check valve 206. The first outer housing 302 can also include a chamber 314. The chamber 314 can be connected to an inflow line 322 and outflow lines 312, 316 for communicating fluid through the hybrid check valve 206. The chamber 314 can include a seat 308. The seat 308 can include any suitable material, for example, metal or ceramic. When the hybrid check valve 206 is in its closed state, a ball 310 within the chamber 314 is configured to rest against the seat 308, forming a fluid seal between the inflow line 322 and the chamber 314. The ball 310 can include any suitable material, for example, ceramic, metal, plastic, thermoplastic, or a composite material. A poppet 318 can press the ball 310 into the seat 308, as described in further detail below. The ball 310 can also be biased with a spring 326, which can press the ball 310 into the seat 308. The pressure provided by the spring 326 can help to create a fluid seal between an inflow line 322 and the chamber 314.

The second outer housing 304 can include the poppet 318. A seal 320 can be positioned around the outer diameter of the poppet 318. The seal 320 can comprise an O-ring. A solenoid valve can transmit hydraulic pressure to the poppet 318, actuating the poppet between an open state (as shown in FIG. 3) and a closed state. For example, upon the solenoid valve applying hydraulic pressure to the left side of the poppet 318, the presence of the seal 320 can generate high pressure to the left of the poppet 318. The high-pressure can move the poppet 318 to the right (i.e., to its closed state). Conversely, when no hydraulic pressure is applied to the left side of the poppet 318, a spring 324 positioned around the outer diameter of the poppet 318 can bias the poppet 318 in its open state.

When the hybrid check valve 206 is in its open state, the ball 310 can rest against the seat 308 in the first outer housing 302. Upon the application of a sufficient pressure differential across the hybrid check valve 206, fluid can enter the inflow line 322 and push the ball 310 off of the seat 308 by lifting the spring. The fluid can then enter the chamber 314 and flow through the outflow lines 312, 316. A seal 325 can prevent fluids in the first outer housing 302 from entering the second outer housing 304, and vice-versa.

When the hybrid check valve 206 is in its closed state, hydraulic pressure can cause the poppet to press the ball 310 against the seat 308 with high pressure. Pressing the ball 310 against the seat 308 can cut off the flow of fluids between the inflow line 322 and the outflow lines 312, 316, creating a fluid seal. Further, in some embodiments, the high pressure from the poppet 318 firmly pressing the ball 310 against the seat 308 can crush, break, or push any debris stuck in the chamber 314 out of the way. In some embodiments, effectively removing debris wedged in the chamber 314 may prevent the hybrid check valve 206 from becoming stuck partially open.

Further, with traditional poppet-type check valves, at the end of each stroke by the pump, pressure equalization can cause large pressure spikes. These large pressure spikes can be undesirable. Conversely, in some embodiments, the combination of both the ball 310 and poppet 318 mechanisms can eliminate the high pressure spikes associated with traditional poppet-type check valves.

While in this example the hybrid check valve 206 includes a ball 310 for preventing fluid communication between the inflow line 322 and outflow lines 312, 316, any closure element positioned in the chamber 314 for cutting off fluid communication between the inflow line 322 and outflow lines 312, 316 may be sufficient. Likewise, while in this example the hybrid check valve 206 includes a poppet 318 positioned for applying a force to the ball 310 in the chamber 314, any hydraulically-actuated closure element positioned for applying a force to the ball 310 may be sufficient.

Figure 4:
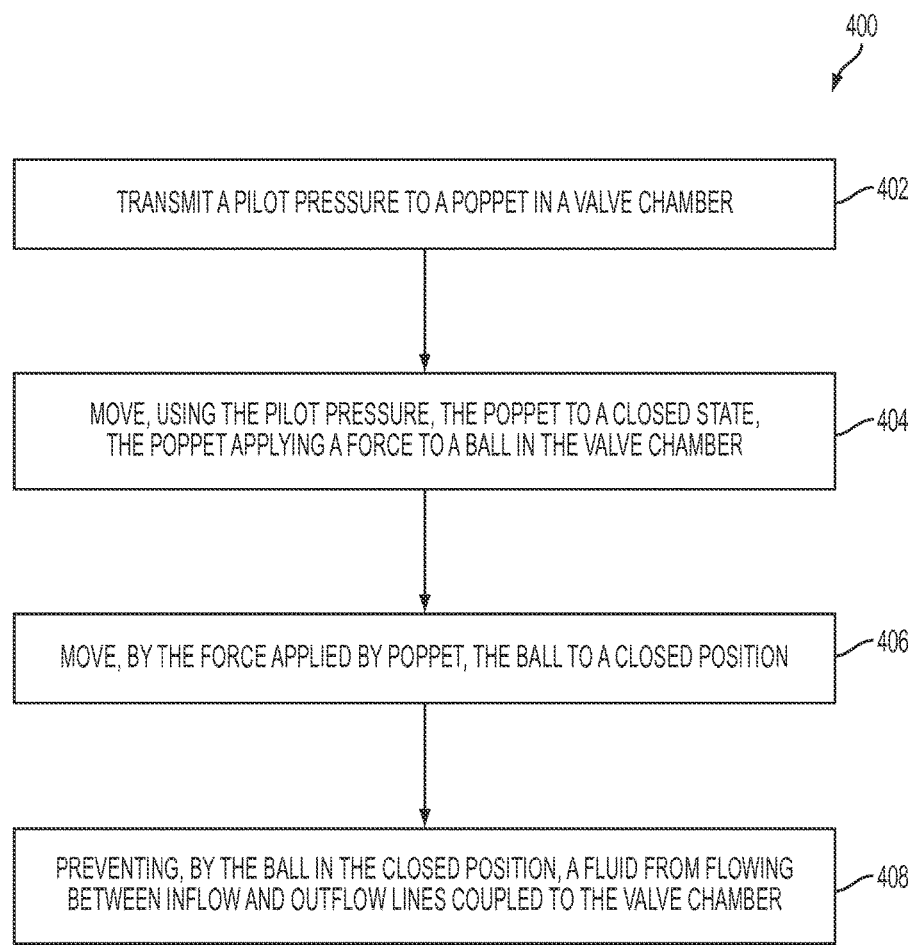
FIG. 4 depicts an example of a flow chart of a process for using a hybrid check valve according to one or more embodiments of the present disclosure.

FIG. 4 depicts an example of a flow chart of a process for using a hybrid check valve according to one or more embodiments of the present disclosure.

In block 402, a pilot pressure is transmitted to a poppet located in a valve chamber. In some embodiments, the pilot pressure can be transmitted to the poppet by a solenoid valve. In some embodiments, the solenoid valve can be controlled by a computing device. The computing device can be in wired or wireless communication with the solenoid valve.

In block 404, the pilot pressure moves the poppet to a closed state. When in its closed state, the poppet can apply a force to a ball in the valve chamber. An end of the poppet can apply the force to the ball by pressing against the side of the ball.

In block 406, the force applied to the ball by the poppet moves the ball to a closed position. In some embodiments, the ball can rest on a seat within the valve chamber, forming a fluid seal between the ball and the seat. In other embodiments, the ball can rest against an O-ring or other structure for forming a fluid seal.

In block 408, a fluid is prevented from flowing, by the ball in the closed position, between inflow and outflow lines coupled to the valve chamber. In some embodiments, the fluid can be transmitted into the inflow or outflow line by a pump. If the ball is in its closed position, the fluid can be blocked by the ball from flowing between the inflow line and the outflow line.

Figure 5:
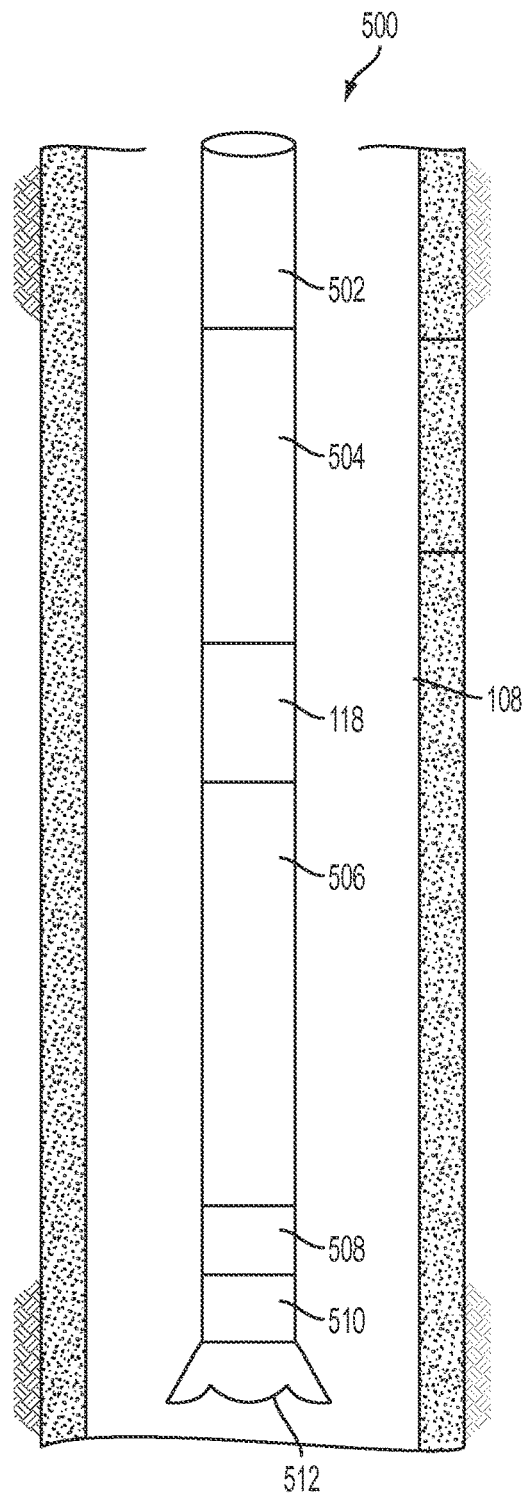
FIG. 5 depicts a system for drilling a wellbore according to one or more embodiments of the present disclosure.

FIG. 5 depicts a system 500 for drilling a wellbore 108 according to one or more embodiments of the present disclosure. In this example, the system 500 is a well system (e.g., an oil or gas well for extracting fluids from a subterranean formation). The well system includes a wellbore 108. A logging-while-drilling (LWD) tool 502 can be positioned in the wellbore 108.

The LWD tool 502 can include various modules 504, 506, 508, 510. For example, the LWD tool 502 can include a measuring while drilling (MWD) module 504. The MWD module 504 can be used to measure one or more characteristics of the well system (e.g., a characteristic of the wellbore 108). In some aspects, the LWD tool 502 can include a compensated dual resistivity (CDR) module 506, a saver sub 508, and a bit sub 510. The LWD tool 502 can include a drill bit 512 for drilling the wellbore 108. The drill bit 512 can be coupled to the bit sub 510.

The LWD tool 502 can include a pump-out module 118. The pump-out module 514 can include a double-acting pump. The pump can be connected to one or more check valves, which can control the flow of fluids through the pump. The check valves can be hybrid check valves, as described above. Although depicted in FIG. 5 as a separate module, the pump-out module 118 can be located elsewhere in the LWD tool 502. For example, the pump-out module 118 can be included in any of the modules 504, 506, 508, or 510. In some aspects, the LWD tool 502 can include one or more hybrid check valves instead of or in addition to hybrid check valves within the pump-out module 118.

Figure 6:
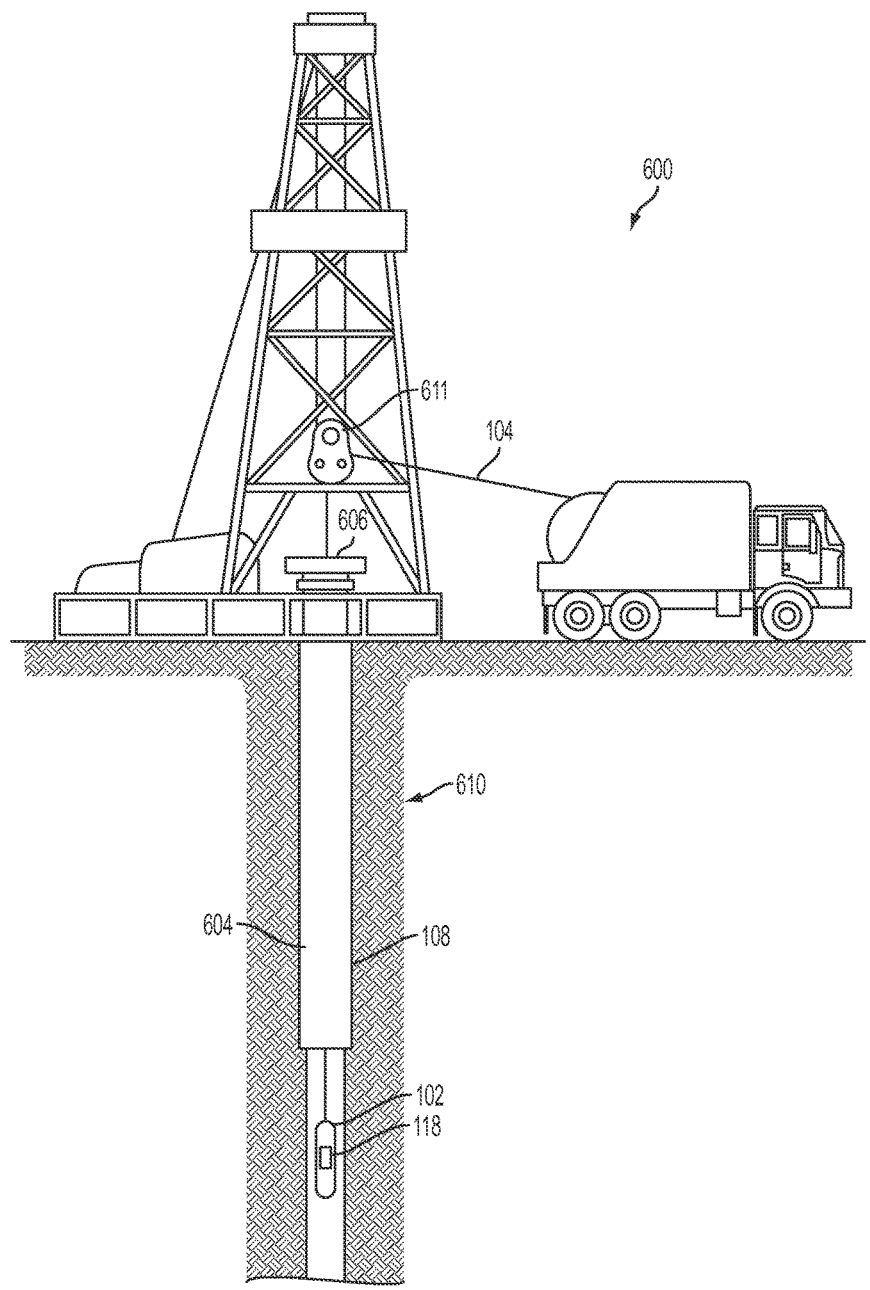
FIG. 6 depicts a system for evaluating a drilled wellbore according to one or more embodiments of the present disclosure.

FIG. 6 depicts a system 600 for evaluating a drilled wellbore 108 according to one or more embodiments of the present disclosure. The system 600 includes a wellbore 108 extending through various earth strata. The wellbore 108 extends through a hydrocarbon bearing subterranean formation 610. A casing string 604 extends from the surface 606 to the subterranean formation 610. The casing string 604 can provide a conduit via which formation fluids, such as production fluids produced from the subterranean formation 610, can travel from the wellbore 108 to the surface 606.

The system 600 can also include at least one formation-testing tool 102. The formation-testing tool 102 can be coupled to a wireline 104 or coiled tube that can be deployed into the wellbore 108, for example, using a winch 611. The formation-testing tool 102 can include a pump-out module 118. The pump-out module 118 can include one or more hybrid check valves. In some aspects, the formation-testing tool 102 can include one or more hybrid check valves instead of or in addition to hybrid check valves within the pump-out module 118.

In some aspects, an assembly for a hybrid check valve is provided according to one or more of the following examples.

Example #1: An assembly for a hybrid check valve can include a check valve. The check valve can include a ball positioned between an inflow line and an outflow line. The ball can be movable between (i) an open position at which a fluid is allowed to flow between the inflow line and the outflow line and (ii) a closed position at which the fluid is prevented from flowing between the inflow line and the outflow line. The assembly can also include a spring positioned adjacent to the ball and operable to bias the ball in the closed position. The assembly can further include a poppet positioned adjacent to the ball. The poppet can be movable in response to a communication of a pilot pressure to the poppet. The ball can move to the closed position in response to a force applied by the poppet.

Example #2: The assembly of Example #1 may feature a seat positioned adjacent to the ball for forming a seal when the ball is in the closed position.

Example #3: The assembly of any of Examples #1-2 may feature the check valve further including a cap that is removably coupled to a housing of the check valve.

Example #4: The assembly of any of Examples #1-2 may feature a seal positioned around the outer diameter of the poppet.

Example #5: The assembly of any of Examples #1-4 may feature a solenoid valve coupled to the poppet. The solenoid valve can be operable to move the poppet.

Example #6: The assembly of any of Examples #1-5 may feature a computing device coupled to the solenoid valve.

Example #7: The assembly of any of Examples #1-6 may feature the ball including a ceramic, metal, plastic, thermoplastic, or composite material.

Example #8: The assembly of any of Examples #1-7 may feature a seal positioned between a first chamber and a second chamber. The first chamber can include the ball and the second chamber can include the poppet.

Example #9: The assembly of any of Examples #1-8 may feature the check valve being positionable within a pump-out module. The pump-out module can be positioned in a wellbore.

Example #10: An assembly for a hybrid check valve can include a first closure element positioned between an inflow line and an outflow line. The first closure element can be movable between (i) an open position at which a fluid is allowed to flow between the inflow line and the outflow line and (ii) a closed position at which the fluid is prevented from flowing between the inflow line and the outflow line. The assembly can also include a spring positioned adjacent to the first closure element and operable to bias the first closure element in the closed position. The assembly can further include a second closure element positioned adjacent to the first closure element/

Example #11: The assembly of Example #10 may feature a seat positioned adjacent to the first closure element for forming a seal when the first closure element is in the closed position.

Example #12: The assembly of any of Examples #10-11 may feature the check valve further including a cap that is removably coupled to a housing of the check valve.

Example #13: The assembly of any of Examples #10-12 may feature a seal positioned around the outer diameter of the second closure element.

Example #14: The assembly of any of Examples #10-13 may feature a solenoid valve coupled to the second closure element. The solenoid valve can be operable to move the second closure element.

Example #15: The assembly of any of Examples #10-14 may feature a computing device coupled to the solenoid valve.

Example #16: The assembly of any of Examples #10-15 may feature the check valve being positionable within a pump-out module. The pump-out module can be positioned in a wellbore.

Example #17: The assembly of any of Examples #10-16 may feature the first closure element including a ball and the second closure element including a poppet.

Example #18: A method for using a hybrid check valve can include transmitting a pilot pressure to a poppet in a valve chamber. The method can also include moving, using the pilot pressure, the poppet to a closed state, the poppet applying a force to a ball in the valve chamber. The method can further include moving, by the force applied by the poppet, the ball to a closed position. Finally, the method can include preventing, by the ball in the closed position, a fluid from flowing between an inflow line and an outflow line coupled to the valve chamber.

Example #19: The method of Example #18 may feature transmitting a second pilot pressure to the poppet. The method may also feature moving, using the pilot pressure, the poppet to an open state. The poppet can remove the force on the ball in the valve chamber Example #20: The method of any of Examples #18-19 may feature pumping fluid through the inflow line. The method may also feature moving, by the fluid, the ball to an open position. Further, the method may feature communicating the fluid between the inflow line and the outflow line.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:
1. An assembly, comprising:
  a check valve that includes a ball positioned between an inflow line and an outflow line, the ball being movable between (i) an open position at which a fluid is allowed to flow between the inflow line and the outflow line and

(ii) a closed position at which the fluid is prevented from flowing between the inflow line and the outflow line;

a spring positioned adjacent to the ball and operable to bias the ball in the closed position;

a poppet positioned adjacent to the ball, wherein the poppet is movable in response to a communication of a pilot pressure to the poppet, and the ball is movable to the closed position in response to a force applied by the poppet; and a solenoid valve coupled to the poppet and operable to move the poppet.

2. The assembly of claim 1, further comprising a seat positioned adjacent to the ball for forming a seal when the ball is in the closed position.

3. The assembly of claim 1, wherein the check valve further comprises a cap removably coupled to a housing of the check valve.

4. The assembly of claim 1, further comprising a seal positioned around an outer diameter of the poppet.

5. The assembly of claim 1, further comprising a computing device coupled to the solenoid valve.

6. The assembly of claim 1, wherein the ball comprises ceramic, metal, plastic, thermoplastic, or a composite material.

7. The assembly of claim 1, wherein a seal is positioned between a first chamber and a second chamber, wherein the first chamber comprises the ball and the second chamber comprises the poppet.

8. The assembly of claim 1, wherein the check valve is positionable within a pump-out module, and the pump-out module is positionable in a wellbore.

9. An assembly for a check valve, comprising:

a first closure element positioned between an inflow line and an outflow line, the first closure element being movable between (i) an open position at which a fluid is allowed to flow between the inflow line and the outflow line and (ii) a closed position at which the fluid is prevented from flowing between the inflow line and the outflow line;

a spring positioned adjacent to the first closure element and operable to bias the first closure element in the closed position;

a second closure element positioned adjacent to the first closure element, wherein the second closure element is movable in response to a communication of a pilot pressure to the second closure element, and the first closure element is movable to the closed position in response to a force applied by the second closure element; and a solenoid valve coupled to the second closure element and operable to move the second closure element.

10. The assembly of claim 9, further comprising a seat positioned adjacent to the first closure element for forming a seal when the first closure element is in the closed position.

11. The assembly of claim 9, wherein the check valve further comprises a cap removably coupled to a housing of the check valve.

12. The assembly of claim 9, further comprising a seal positioned around an outer diameter of the second closure element.

13. The assembly of claim 9, further comprising a computing device coupled to the solenoid valve.

14. The assembly of claim 9, wherein the check valve is positionable within a pump-out module, and the pump-out module is positionable in a wellbore.

15. The assembly of claim 9, wherein the first closure element comprises a ball and the second closure element comprises a poppet.

16. A method, comprising:

operating a solenoid valve to transmit a pilot pressure to a poppet in a valve chamber;

moving, using the pilot pressure, the poppet to a closed state, the poppet applying a force to a ball in the valve chamber;

moving, by the force applied by the poppet, the ball to a closed position; and preventing, by the ball in the closed position, a fluid from flowing between an inflow line and an outflow line coupled to the valve chamber.

17. The method of claim 16, further comprising:

transmitting a second pilot pressure to the poppet; and moving, using the pilot pressure, the poppet to an open state, the poppet removing the force on the ball in the valve chamber.

18. The method of claim 17, further comprising:

pumping fluid through the inflow line;

moving, by the fluid, the ball to an open position; and communicating the fluid between the inflow line and the outflow line.

* * * * *